(12) United States Patent
Watanabe et al.

(10) Patent No.: US 7,451,485 B2
(45) Date of Patent: Nov. 11, 2008

(54) INFORMATION PROCESSING UNIT HAVING TAMPER-RESISTANT SYSTEM

(75) Inventors: Takashi Watanabe, Kokubunji (JP); Takashi Endo, Musashimurayama (JP); Masahiro Kaminaga, Sakado (JP); Kunihiko Nakada, Koganei (JP); Yuuichirou Nariyoshi, Kodaira (JP); Chiaki Tanimoto, Tsukuba (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 710 days.

(21) Appl. No.: 10/124,576

(22) Filed: Apr. 18, 2002

(65) Prior Publication Data

US 2002/0169969 A1    Nov. 14, 2002

(30) Foreign Application Priority Data

May 9, 2001    (JP)    ............................. 2001-138073

(51) Int. Cl.
*G06F 9/00*    (2006.01)
*G06F 11/00*    (2006.01)
(52) U.S. Cl. ............................. 726/23; 726/20; 713/193
(58) Field of Classification Search ...................... 726/2, 726/8, 14, 20, 23; 713/194, 193; 235/492
See application file for complete search history.

(56) References Cited

U.S. PATENT DOCUMENTS

| | | | |
|---|---|---|---|
| 4,430,706 A * | 2/1984 | Sand | 712/237 |
| 4,799,153 A * | 1/1989 | Hann et al. | 726/3 |
| 4,816,653 A * | 3/1989 | Anderl et al. | 235/380 |
| 4,959,860 A * | 9/1990 | Watters et al. | 726/19 |
| 4,962,530 A * | 10/1990 | Cairns | 713/183 |
| 5,286,962 A * | 2/1994 | Fujioka et al. | 235/492 |
| 5,293,424 A * | 3/1994 | Holtey et al. | 713/193 |
| 5,937,346 A * | 8/1999 | Ono | 455/411 |
| 6,542,645 B1 * | 4/2003 | Silverbrook et al. | 382/254 |

FOREIGN PATENT DOCUMENTS

| | | |
|---|---|---|
| JP | 59-193641 A | 11/1984 |
| JP | 62-249238 | 10/1987 |
| JP | 62-293441 | 12/1987 |
| JP | 2-165343 A | 6/1990 |
| JP | 11-096120 | 4/1999 |

OTHER PUBLICATIONS

Anderson et al., "Tamper Resistance—A Cautionary Note", 1996, USENIX Association, The Second USENIX Workshop on Electronic Commerce Proceedings, pp. 1-11.*

(Continued)

*Primary Examiner*—Kambiz Zand
*Assistant Examiner*—William S Powers
(74) *Attorney, Agent, or Firm*—Mattingly, Stanger, Malur & Brundidge, P.C.

(57) ABSTRACT

A malfunction detection system is provided that can continue or terminate processing appropriately even if a malfunction occurs in an information processing unit. In this regard, the information processing unit receives branch direction information, carries out a conditional branch depending on the branch direction information, and performs an applicable operation on data I. At this time, the information processing unit performs an applicable operation on data J, other than the operated data I, in the conditional branch path and outputs the result for examination, thereby enabling validation of the conditional branch.

6 Claims, 14 Drawing Sheets

OTHER PUBLICATIONS

Notification of Reasons for Refusal (Office Action) issued by Japan Patent Office dated Feb. 23, 2007 to corresponding Japanese patent application No. 2001-138073.

Notification of Reasons for Refusal (Office Action) issued by Japan Patent Office dated May 15, 2007 to corresponding Japanese patent application No. 2001-138073.

* cited by examiner

INFORMATION PROCESSING UNIT HAVING TAMPER-RESISTANT SYSTEM

BACKGROUND OF THE INVENTION

The present invention relates to an information processing unit, and, more particularly, to a tamper-resistant system that provides for protection against unauthorized intrusion by persons attempting to obtain information available inside the system and protection against malfunctions of the type caused by electromagnetic waves, radiation, power glitches and other physical means, or system analysis aiming at obtaining the information.

In the present day, as electronic systems have become widespread, diverse systems tend to radiate electromagnetic waves at various frequencies. Under these circumstances, various phenomena occur, such as a speaker that has been placed adjacent to a TV set causing distortion of the pictures displayed on the TV set. As typified by a computer installed in a motor vehicle, systems are required that will not fail to work properly even in environments where there is intense vibration and an unstable power supply, or that have means for ensuring recovery from irregular operations. In order to describe phenomena and systems of this type, terms such as 'tamper evident', 'tamper response', 'tamper free' (also referred to as tamper resistant) are used; and, these terms refer to detection of irregular operations, response after the detection, and resistance to irregular operations, respectively.

To serve their intended purposes successfully, electronic systems generally have operating margins that are preset to allow for factors that might cause malfunctions, such as noise in practical operation environments. A tamper-evident system has an appropriate means for storing a history indicating whether the system has been subjected to unexpected environments that might have generated malfunctions or not, so the administrator need not monitor the system constantly and can prescribe appropriate remedies for malfunctions just by checking the history periodically. A system with a tamper-response capability can observe system circumstances on its own to detect occurrences of unexpected circumstances that might cause malfunctions; and, if it detects such circumstances, it has a means for taking necessary actions, such as issuing an alarm. The administrator of this kind of system must check its operation only when alarms are issued. A tamper-free system is designed with sufficient care to prevent it from being subject to an irregular operating condition, and such a system can automatically recover even if it does become subject to an irregular operation.

If the word tamper is interpreted as referring to an action by a malicious person, a system that has a mechanism for protecting its components completely against attacks aimed at the components by such a malicious person can also be referred to as tamper-free. If a system, such as a banking terminal having a memory retaining secret information, is opened by unauthorized access, for example, this type of system itself can automatically erase or destroy the information retained in the memory to protect it from being accessed. A tamper-free system eliminates the necessity of monitoring by its administrator.

The word tamper used herein means either a change in the operating environment or an intentional attack made by a person with malicious intent.

Electronic systems tend to generate so-called malfunctions or fall into a suspended mode when the intensity of electromagnetic waves, radiation, temperature, vibration, or other factors exceed a range anticipated at the time of design. This tendency is caused by the fact that these systems operate both electrically and mechanically. In a system employing relatively few components, even if a simple full search is performed, the cost of identifying the causes of problems and of taking countermeasures in connection therewith is relatively low. If electronic components are combined with each other, however, it becomes difficult to check their types and methods completely; and, accordingly, it is extremely difficult to ensure that the system will not fail to function normally. Therefore, systems that must depend on many components to assure the security of the entire system require greater attention to their tamper-resistant capabilities. Examples of such systems include a microprocessor used in a central processing unit (CPU), which is a highly integrated semiconductor device having on the order of tens of thousands to millions of circuit elements, and an IC card with a CPU, memory cells, external interfaces and other electronic components integrated in a silicon chip only a few millimeters square or less. Conventionally, such systems are designed to operate with an implied guarantee that a higher level system can rely entirely on the security of its lower level systems, which means that there is a possibility that failures and malfunctions of the lower level system may cause the whole system to halt unexpectedly or fall into a malfunctioning state.

FIG. 1 is a schematic illustration of an IC card 101 that is equipped with a contact terminal area 102, through which information is exchanged between the inside and outside. The Vcc, RST, CLK, and I/O terminals receive power, reset signals, clock signals, and input and output signals, respectively. GND indicates a ground terminal. IC cards and other security-intensive cards use a central processing unit 201, as shown in FIG. 2, to perform cryptographic and other operations using a secret key. The IC card also includes a coprocessor 202 that is connected via a bus 203 to a memory 204, which further includes a program 205. Since an IC card provides a link between the inside and outside only through an I/O port 207 and data operated on in the CPU is not output to the outside, data 206 retained in secrecy in memory 204 has been considered to be highly secure. However, Biham and Shamir have proved that IC cards subject to external stresses, such as radiation and electromagnetic waves, may malfunction; and, accordingly, they allow acquisition of secret-key information used therein by observing the computed results. As they disclose in *Differential Fault Analysis of Secret Key Cryptosystems* (Lecture Notes in Computer Science, Advances in Cryptology, proceedings of CYPTO'97, Springer-Ferlag, pp. 513 to 525, 1997), it is possible to cause partial errors in values in arithmetic and logic operations and identify a secret key used therein from the computed results. Therefore, only observing that a computer system in an IC card continues operating is not sufficient to assure the security of the IC card. It is necessary to check the component devices themselves to see if they are operating correctly as the system designer(s) intended.

SUMMARY OF THE INVENTION

Conventional information processing systems experience malfunctions due to external radiation, electromagnetic waves, and vibration, which may cause unexpected leakage of information and failures as a result. With an unstable power supply, systems tend to start malfunctioning from a section that is most susceptible to abnormal voltage. Since the most susceptible section differs from system to system depending on the connection relationships and design of the system, it is difficult to determine the most susceptible section in an integrated device. In addition, tracking the mutual relationships among devices combined in a higher level is expensive and it is difficult to predict possible malfunction phenomena.

One object of the present invention is to provide an information processing unit that is capable of resuming suspended processing or halting processing appropriately according to different types of malfunctions.

I. Embodiments of the present invention employ, as one remedy against glitch attacks, a technique of writing a conditional branch instruction successively a plurality of times.

Embodiments of the present invention employ, as one remedy against glitch attacks, a technique of writing a conditional branch instruction successively a plurality of times.

This provides a remedy in case a conditional branch instruction fails to behave correctly when a glitch attack is encountered, resulting in a substantially unexecuted instruction.

Structures associated with this remedy will be described below.

An information processing unit compares an input password to the correct password in order to determine whether a password input for obtaining access to an application or information stored in an IC card chip is correct or incorrect; it executes an instruction if they both match; if they do not match, it stores a first branch instruction for executing a branch in a memory; and, subsequent to (or immediately after) the first branch instruction, a second branch instruction identical to the first branch instruction is stored in the memory.

The information processing unit described above basically writes identical branch instructions successively. In contrast, the following information processing unit writes different branch instructions successively.

An information processing unit has a structure in which a first branch instruction is executed if the value of a condition flag F1 is 0 or 1, and a second branch instruction is executed if the value of the condition flag F1 is 1 or 0; and, when the first branch instruction is executed, if the branch is not taken based on the value of the condition flag F1, the subsequent processing inverts the value of the condition flag, and then the second branch instruction is executed.

The information processing unit described above, further has a structure in which the first and second branch instructions are used for deciding whether an input password is correct or not; if the input password is determined to be correct, access to an application or information stored in the IC card chip is executed after the determination has been made.

An information processing unit has a first branch instruction that is executed if the value of a condition flag F1 is 0 or 1 and a second branch instruction that is executed if the value of the condition flag F2 is 0 or 1; in which, when the first branch instruction is executed, if the branch is not taken based on the value of the condition flag F1, the subsequent processing copies the value of the condition flag F1 to the condition flag F2, and then the second branch instruction is executed.

II. The following structure relates to checking branch paths. When a branch is taken according to a branch instruction, the branch direction must become clear by the time immediately before the execution of the branch instruction at the latest, but there are cases in which whether the branch instruction is correctly executed or not must be verified. In these cases, specific processing is performed at the destination of the branch and the result is compared with a prestored destination of the branch, thereby checking to see whether a correct branch has been executed or not. The following information processing unit has a structure with this function.

An information processing unit executes a branch instruction designating one of a plurality of branch paths based on a branch condition, then it executes a sequence of instructions coded on the designated branch path. This information processing unit is provided with a means for storing first data indicating which branch path of the plurality of branch paths was taken by execution of instructions coded on the branch path, and means for checking the consistency between the first data and branch path data providing a decision reference for the branch condition.

III. This relates to a function of limiting the number of loop iterations to suppress abnormal operation of the information processing unit. This structure provides a plurality of counters to perform similar decrement processing in a loop, for example, and if the value of each of the counters becomes zero or a mismatch among the values of the plurality of counters occurs, a process of exiting from the loop is executed. This prevents the loop processing from being executed more than a predefined number of times. The following are specific examples of this structure.

An information processing unit has a structure that initializes the values of first and second counters; it decrements the values of the first and second counters in a loop; if the values of the first and second counters after the decrement processing mismatch, or the values of the first and second counters after the decrement processing are both a first given value, it performs processing for exiting from the loop; and, if the values of the first and second counters after the decrement processing are both a second given value, it repeats the processing in said loop.

In the information processing unit described above, the first given value is 0 and the second given value is a natural number.

An information processing unit has a structure that initializes the values of first and second counters; updates the values of the first and second counters in a processing loop; if the values of the first and second counters after the update processing are different from each other, exits from the loop; and otherwise repeats the processing in the loop.

The information processing unit described above, wherein the updating of the counter values is a process of incrementing or decrementing the count values before the update.

The information processing unit described above, wherein the first given value is 0.

IV. A means for blocking such actions as disconnecting a part of an information processing unit and continuing use it will be described below. This provides a specific counter associated with a part in the system, and a function for updating the value of the specific counter every time the part is used and inhibiting use of the part when the value becomes equal to or less than a defined value. Specific will be described below.

An information processing unit has a counter storing a value indicating a limitation of the number of times a part of the system is to be used; a means for updating the counter value according to the number of times a part of the system has been used; a means for restricting the use of a part of the system if the accumulated number of times the part of the system has been used reaches the limitation of the number of times the part can be used; and a means for releasing the usage limitation by updating the counter value in response to a command from another part of the system when use of a part of the system is limited.

In the information processing unit described above, if the accumulated usage times of a part of the system reaches the limitation of the number of times it can be used, use of the part of the system may be rejected thereafter.

In the information processing unit described above, a structure is provided in which inputting an applicable command to the system releases the limitation of use.

In the information processing unit described above, a means for inputting the command, plus a means for verifying the validity of the command input are provided.

DESCRIPTION OF THE PREFERRED EMBODIMENTS

Assume that there is a computing system in which, if the power supply is unstable, partial malfunctions may occur, rather than malfunctions in the computing system as a whole. More specifically, if an instruction, execution section of the computing system receives an instruction and enters into a silent state, while the other sections are operating normally, the computing system can be seen as a system that does not execute the instruction. Such a malfunction becomes a serious problem when a conditional branch is executed.

(1) Remedy for Malfunctions by Writing a Plurality of Similar Conditional Branch Instructions.

Figure 1:
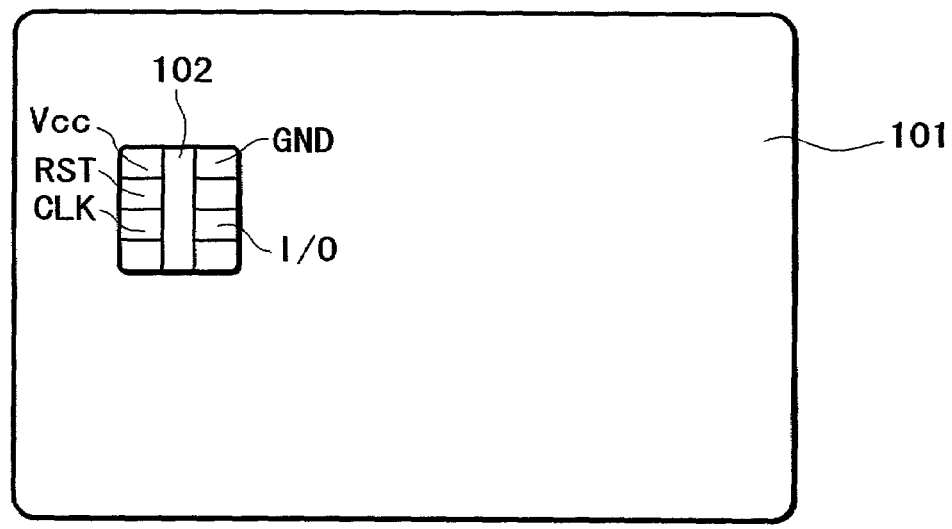
FIG. 1 is a diagram which shows the appearance of a typical IC card.
Figure 2:
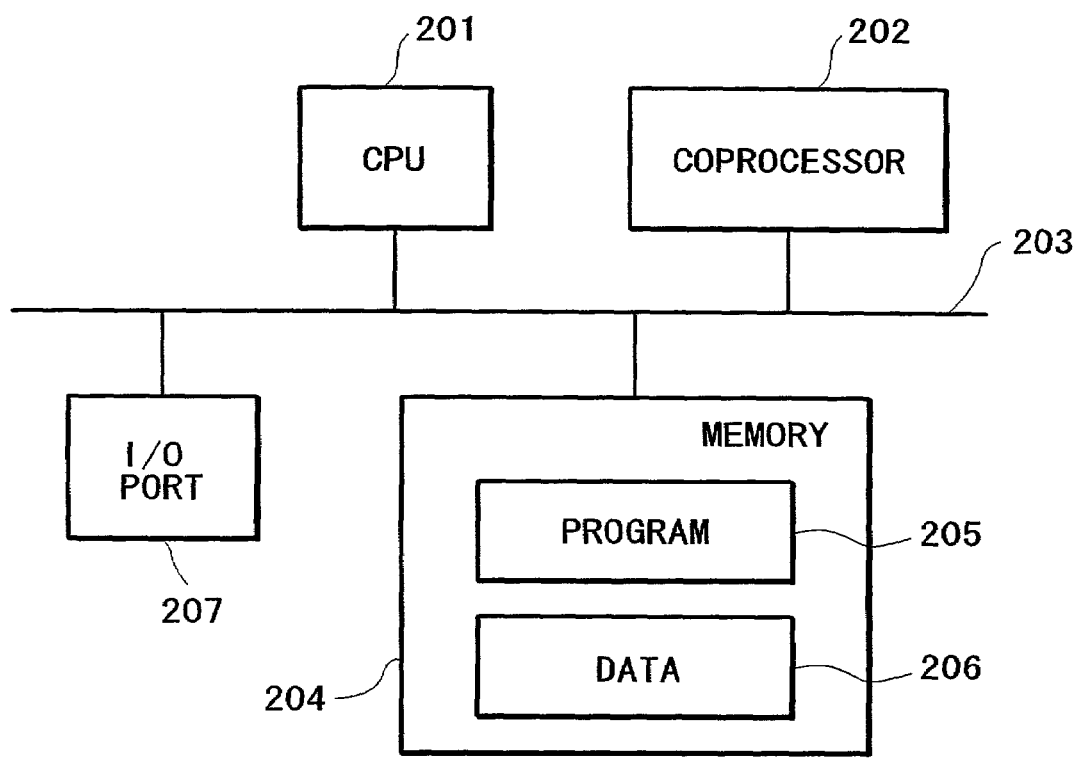
FIG. 2 is a block diagram showing an example of the structure of a semiconductor chips in an IC card.
Figure 3:
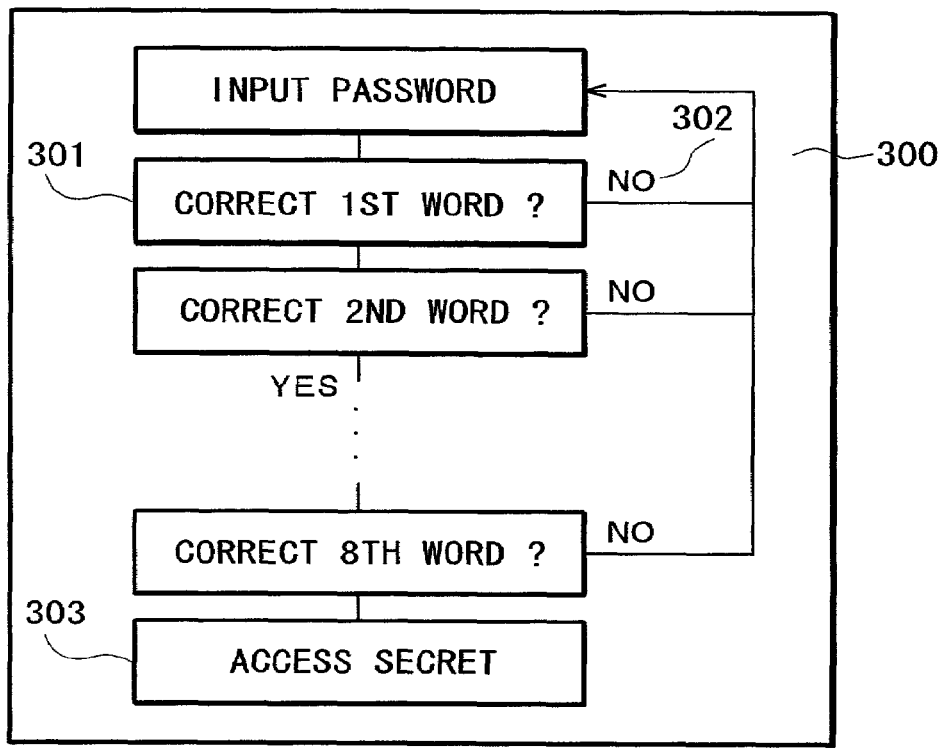
FIG. 3 is a flow diagram showing an example of typical password check processing.

FIG. 3 is a diagram showing the flow of a typical password check process. If the password check system (300) determines that a password is invalid (No) (302) in any one of the check stages (301), it returns the processing to the password input stage. At this time, if the above malfunction (silence of a conditional branch instruction) occurs, the password check system (300) skips operations in the check stages (301) and proceeds to the next processing stage, so that there is a possibility that the system may eventually proceed to the valid password processing stage (303) regardless of whether the password is valid or invalid.

Figure 4:
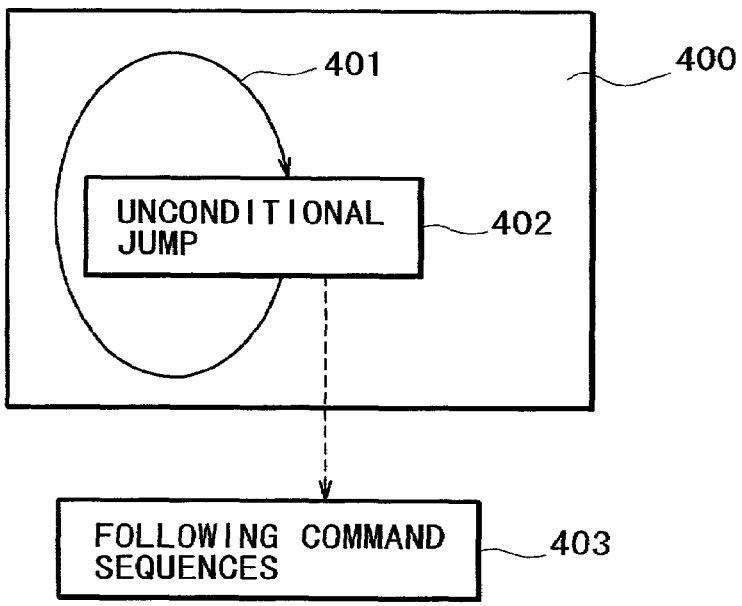
FIG. 4 is a diagram illustrating an exit from an infinite loop due to a malfunction.

As shown in FIG. 4, if an error occurs in the password check system, it generally enters an infinite loop (400) so as to prompt the user to reset the system. Suppose the system malfunctions during operation in the infinite loop (401). There is a possibility that the system may not take the unconditional jump (402) necessary for staying in the infinite loop. In this case, the system exits the infinite loop and can proceed to the following instruction sequence (403) written at the subsequent address and continue executing commands written in the program sequentially. This is an undesirable operation that was not predicted by the programmer.

Figure 5:
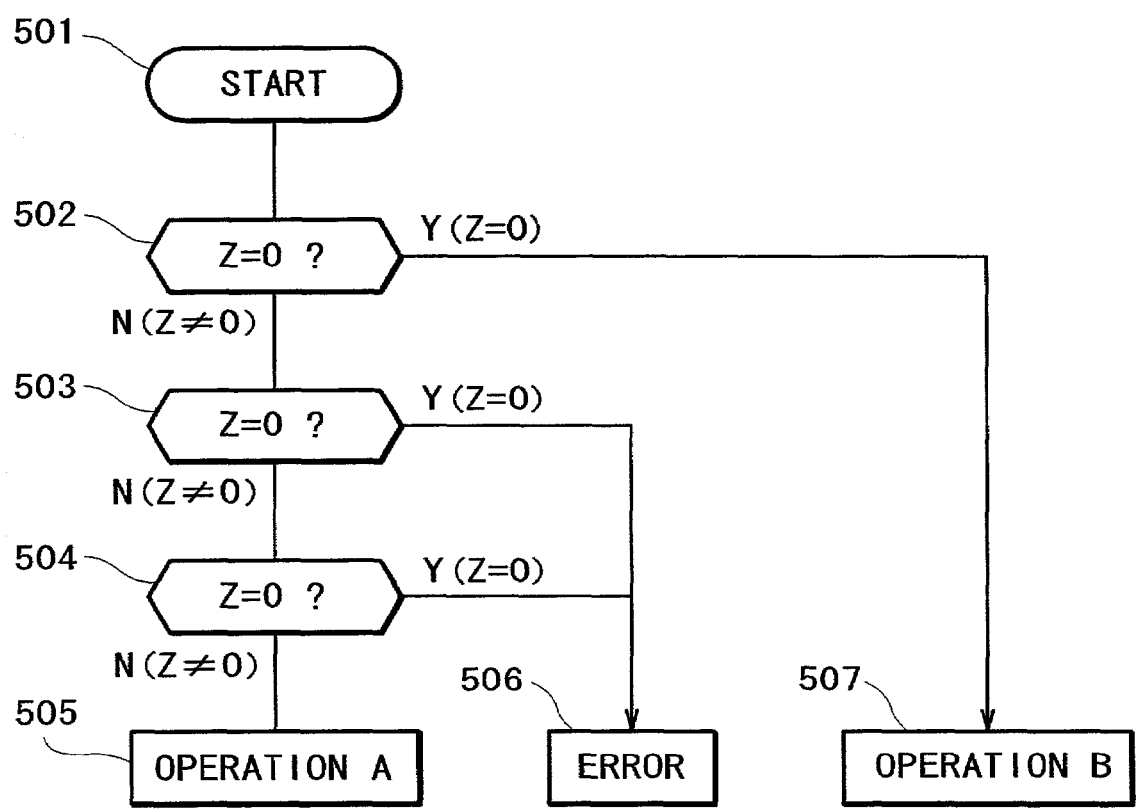
FIG. 5 is a flow diagram of a process for detecting malfunctions by executing conditional branches a plurality of times.

As shown in FIG. 5, an information processing unit starts (501) a process for detecting malfunctions. Repeating a conditional jump a plurality of times (502, 503, and 504) can prevent the problem described with reference to FIG. 4 from occurring. Repetitive execution of branch instructions with an identical condition has no effect on the processing flow, and if the malfunction is sporadic, one of the repetitively executed branch instructions will be processed successfully. Another possible method is to define an error processing unit (506) with control provisions for halting system operations or issuing a malfunction alarm as a destination of the second and later conditional jumps (503 and 504). This method is effective because jumps at the second and later conditional branches are all caused only by the malfunction described above. Therefore, the system can be said to have a tamper-evident capability. If no malfunction occurs, operation A (505) and operation B (507) are executed.

A typical operation of an information processing unit is based on the state of a program counter, such that programs placed at addresses pointed to sequentially by the program counter are executed. The memory that stores the programs and data generally consumes power during read and write operations. Since the memory needs to go through a series of complicated steps for these operations, if a malfunction occurs due to an unstable power supply, it may become impossible to read the programs and data into the system. A system designed without extra care taken for this type of malfunction passes through the program step pointed to by the program counter by doing nothing when a malfunction occurs due to an unstable power supply, while the program counter, which consumes less power than memory, is updated with a simple arithmetic operation and may advance to the next program step. Passing through conditional branch processing without doing anything is equivalent to the case in which the branch condition is determined to be false, so it may cause a result unintended by the designer. An example is processing that returns to the input operation step if an input value is negative, and otherwise proceeds to the next step. If processing proceeds to the next step without checking an input value due to a malfunction, the subsequent program assumes that the input value is positive, so an unexpected malfunction may arise. In this case, setting a conditional branch instruction to be repeated two or more times as in this embodiment makes it possible to reduce the probability of a transition to the next state without processing the conditional branch instruction. Conditional branch processing brings about no change in the system, so its repetitive execution will raise no extra problems. In addition, use of an instruction with a reversed condition and condition checks with other condition flags allow branch instructions with different conditions mixed. If a malfunction due to an environmental factor depends on an instruction itself, the present invention can effectively reduce the probability that the system will be affected by successive malfunctions of the same type.

The information processing unit, as shown in FIG. 5, references condition flag Z (zero flag) and executes branch processing (502) if Z=0. The present invention executes branch processing (502), and then identical branch processing (503). This embodiment further executes identical branch processing (504). This is a protective mechanism allowing for the case in which the branch processing is not executed. Since a conditional branch instruction brings no change in the internal state of the information processing unit, thereby to further reduce the probability of malfunctions, it can be executed an arbitrary number of times, not limited to three times, as indicated in this embodiment. Since the second and later branch processing causes a jump only when the first branch processing is passed through due to a malfunction, it is possible to define the error processing unit (506) as a destination of the second and later branch processing. If the error processing unit is not defined as the destination and operation B (507) is defined instead as with the first branch processing, it becomes possible to continue processing even under an environment causing malfunctions. The condition Z=0 shown in FIG. 5 indicates that the computed result is zero; general arithmetic and logic units provide condition flags indicating such computed results. This embodiment references the Z flag, but other flags may be used.

(2) Remedy for Malfunctions by Combination with Other Branch Instructions

As described above, an unstable power supply does not always cause the entire system to be unstable, but it tends to cause malfunctions in the most susceptible section first. Therefore, its impact varies from instruction to instruction of a computer; whereby, some instructions may continue to operate normally, while some other instructions malfunction. A process starts (601) in FIG. 6 for detecting malfunctions by using two different branch instructions. Incidentally, an arithmetic and logic unit can implement two types of instructions (602 and 604 in FIG. 6) in association with the values 0 and 1 for each condition flag: an instruction that causes a jump when the Z flag (zero flag) is 0 (602), and an instruction (604) that causes a jump when the Z flag is 1 (604). Therefore, this embodiment inverts the bit value of the condition flag (603) and uses a different instruction to cause another conditional jump. This embodiment also inverts the bit value of the condition flag (605) and uses a different instruction to cause yet another conditional jump. Countermeasures against sporadic malfunctions can be taken just by writing an identical branch instruction a plurality of times, whereas persistent malfunctions can pass through a series of the identical instructions. Mixing different instructions can increase the probability of detection of such persistent malfunctions. The principal procedures are as follows.

1. Execute a conditional branch instruction.

2. Invert the value of the condition flag.

3. Execute a conditional branch instruction, inverting the condition in 1 above.

To produce an effect equivalent to that described above, a condition check with a different instruction may be carried out by copying the value of a status register storing a condition flag onto a status register storing another condition flag. In this case, the following procedure is used.

1. Execute a conditional branch instruction.

2. Move the condition flag value used in 1 above into a status register storing another condition flag.

3. Execute a conditional branch instruction corresponding to the other condition flag indicated in 2 above.

This case, for the same reason as described above, can also provide a tamper-evident property by defining an error processing unit (608) with an alarm generator or a halt controller, as the destination address of the second (604) and later (606) branch instructions.

Figure 6:
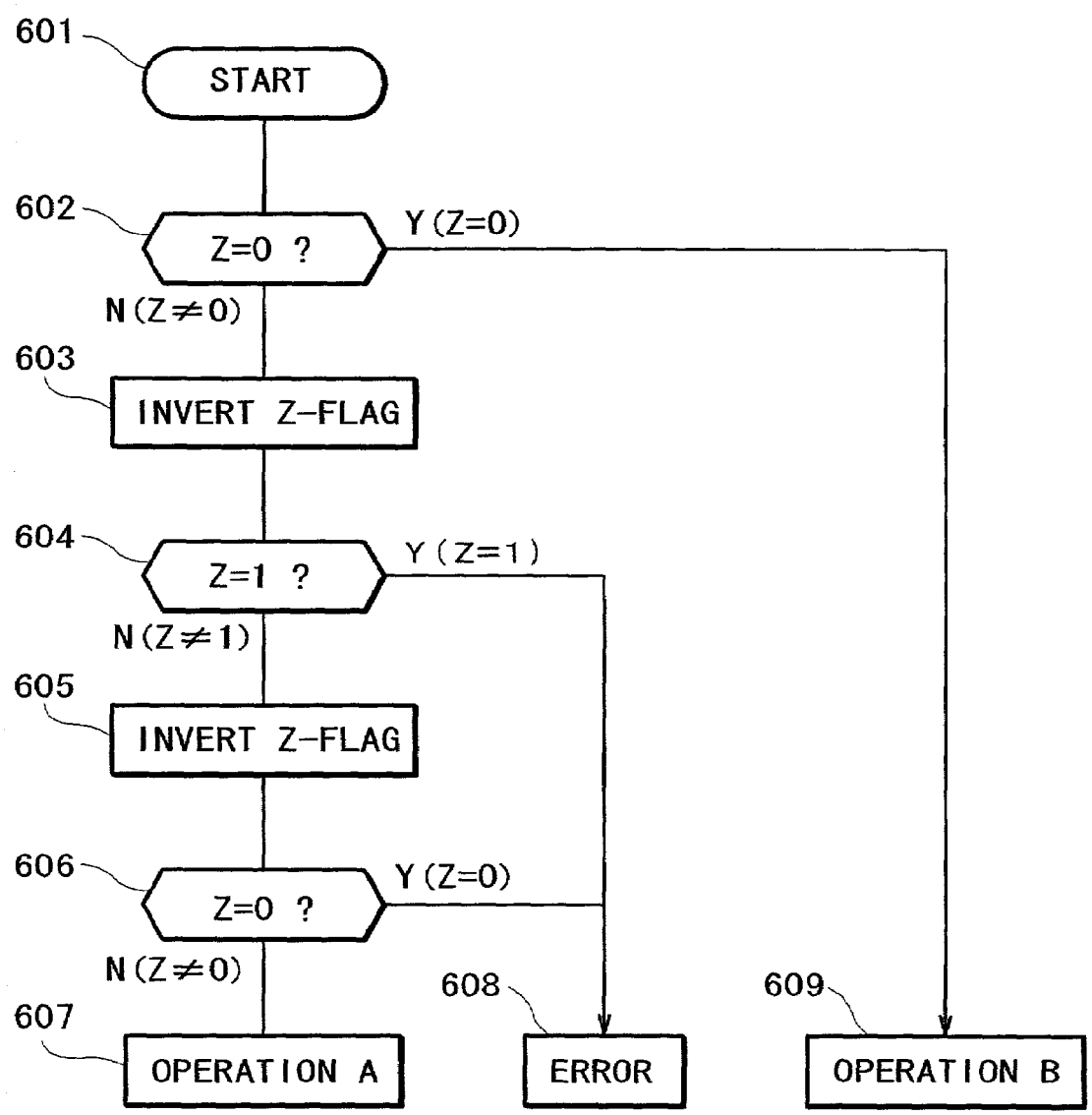
FIG. 6 is a flow diagram of a process for detecting malfunctions by using two different branch instructions.

Incidentally, there are differences in the probability and state of occurrence of malfunctions among different instructions. Therefore, executing equivalent processing by different methods becomes a remedy for malfunctions. As shown in FIG. 6, inverting the branch condition (603) after execution of branch processing (602) makes it possible to use a different instruction (604) for the branch processing, thereby enabling a malfunction to be effectively avoided. If no malfunction occurs, operation A (607) and operation B (609) are executed. Although the condition flag Z has been mentioned above, other flags may be used for similar processing.

Figure 7:
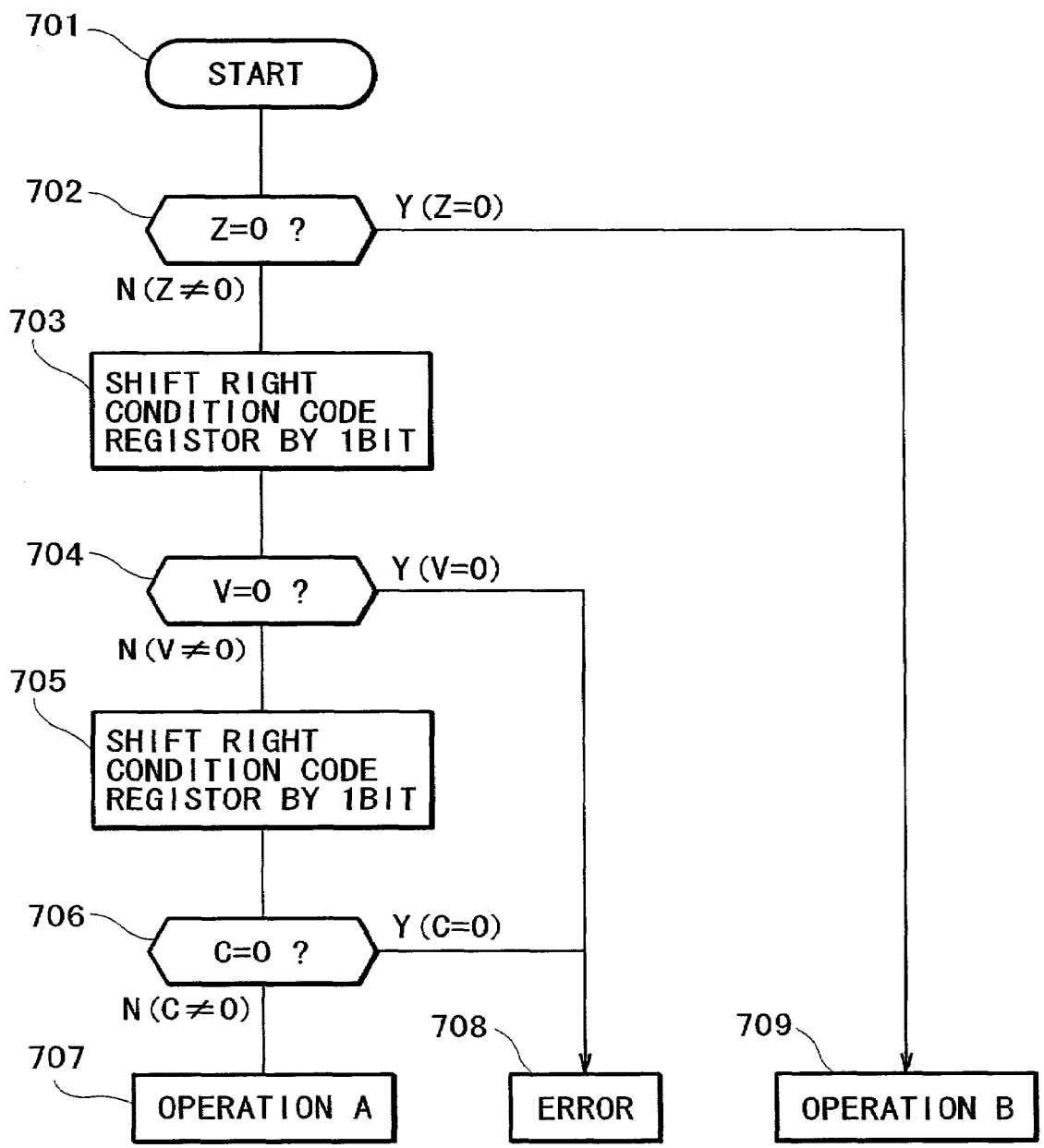
FIG. 7 is a flow diagram of a process for detecting malfunctions by moving branch condition data to another flag.

Furthermore, it is also possible to move the result of a condition flag stored in a status register to another condition flag position by a bit shift instruction, for example, and to execute a condition check with a different conditional branch instruction by the use of the result. There is generally a status register or condition code register (CCR) that indicates the status of data operated on by an arithmetic and logic unit. It generally has an H flag, N flag, Z flag, V flag, and C flag, which represent half-carry, negative, zero, overflow, and carry flags, respectively. The half-carry bit is set to 1 when a carry or borrow appears in the central bit in an arithmetic operation; the negative flag is set to 1 when the computed result is a negative value; the zero flag is set to 1 when the computed result is zero; the over-flow flag is set to 1 when the computed result causes an overflow; and the carry flag is set to 1 when a carry has occurred in the computation. These flags occupy one bit each in the status register and are arranged sequentially. The arrangement may vary from CPU to CPU, so that the HNZVC arrangement is assumed herein, and the upper three bits of the 8-bit status register are assumed to be always zero. FIG. 7 shows a case that starts at 701 in which an operation B (709) is to be executed when the zero flag is 0. The first branch processing (702) uses the zero flag to cause a jump. Next, the status register (its arrangement is 000HNZVC as described above) is shifted to the right by one bit to move the bit in the zero flag position to the V flag position (703). That is, checking the V flag is, in effect, identical to checking of the Z flag in the previous position (704). If the status register is still further shifted to the right by one bit, the bit in the V flag position moves to the C flag position (705). Checking the C flag makes it possible to check what was previously the Z flag value (706). As described above, it is possible to detect malfunctions of some instructions by using a plurality of different instructions. If no malfunction occurs, operation A (707) and operation B (709) are executed.

(3) Checking Processing Paths

If a program counter in a CPU operates abnormally due to malfunctions caused by noise, there is a possibility that a conditional branch may not necessarily be processed according to the condition as intended by the program designer, or processing performed from the top sequentially under normal circumstances may be performed in a wrong order due to malfunctions. It is necessary to provide a means for determining whether the processing in each branch path has been executed correctly or not, allowing for occurrence of such situations. The determination is performed following the steps shown below.

1. Store branch direction information (information on where to jump).

2. Execute branch operations.

3. Execute applicable operations on the branch path.

4. Store information depending on the path.

5. Check consistency between the branch direction information stored in 1 above and the information stored in 4 above after completion of processing at the branch destination.

Mismatch of the comparison result in processing 5 above means that the branch processing has not been executed as expected. Therefore, in that case, it is possible to perform appropriate post-processing, such as bringing the system to a halt, as error processing, or to return to the state before the jump to repeat the processing.

Figure 8:
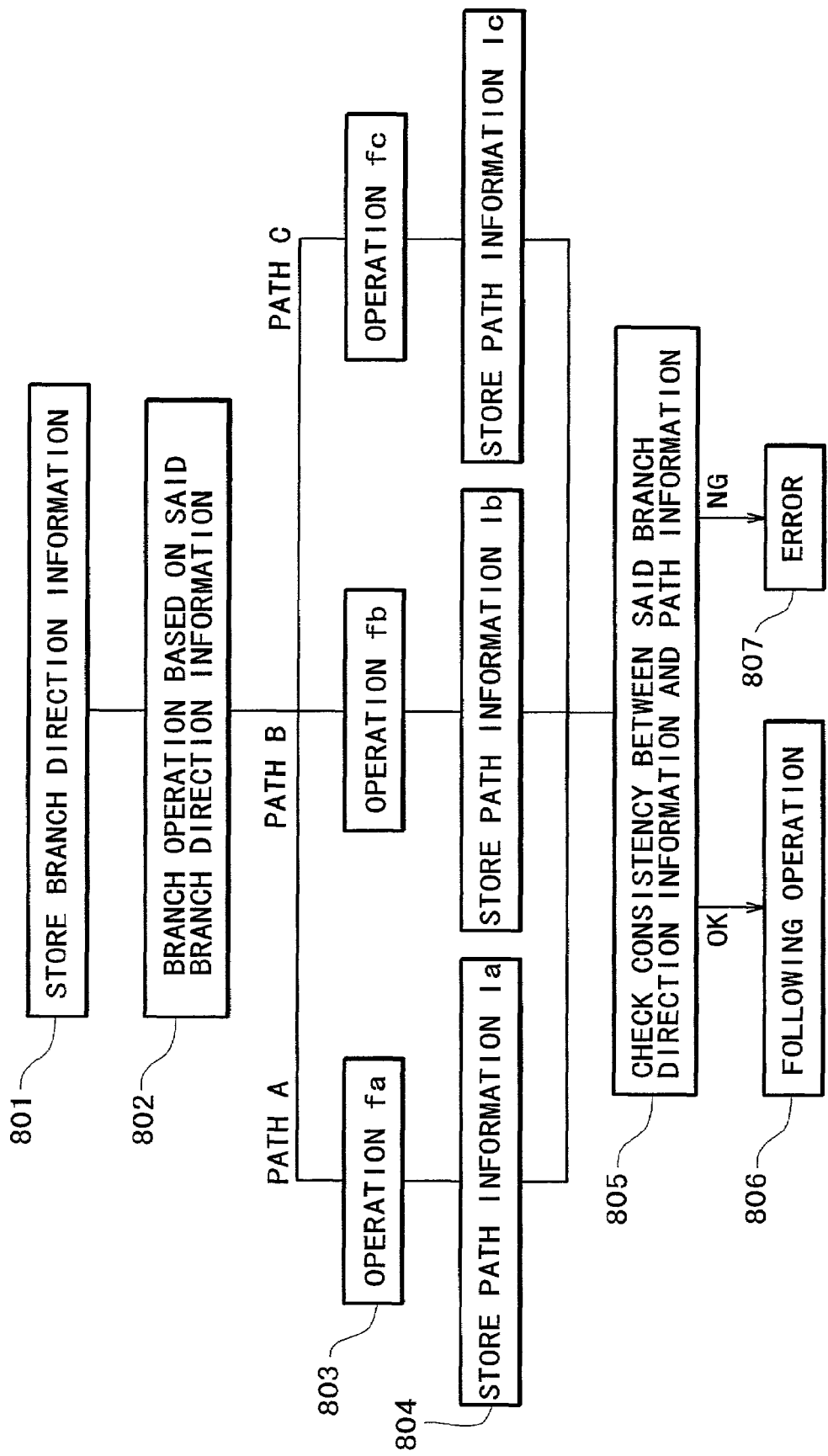
FIG. 8 is a flow diagram of branch processing with a mechanism for checking whether a path is selected correctly by storing information depending branch directions.

FIG. 8 shows a process flow according to this embodiment. To execute a branch instruction, information for determining a branch direction is stored in memory (801). The branch instruction determines a branch path based on the branch direction information (802). Now, suppose path A is selected based on the branch direction information, operation fa depending on the path is performed (803), and further information Ia specific to the path is stored in the memory (804). After the completion of the operation, the system verifies that a correct branch path has been selected by checking the consistency between the branch direction information and the path information (805). If the system determines that the path is wrong, it performs error processing (807), such as terminating the processing or displaying an error message. If the path is okay, a following operation is performed (806).

Here, suppose a program in bank terminal equipment executes a deposit operation. As an example, the system stores the character string 'deposit operation' in the memory. Next, a branch instruction reads the character string 'deposit operation' and selects the deposit operation path. The system actually receives money on the deposit operation path and then stores a character string 'deposit path selected' that indicates that the deposit operation path is processed in the memory. After completion of the processing of the operation path as described, the system can check the consistency between the character string 'deposit operation' it has stored prior to the branch operation and the character string 'deposit path selected' it stored in the actual path to verify that the intended operation path has been selected correctly. If a jump to an unintended operation path, such as a withdraw operation path, has been taken due to a malfunction during the execution of the branch instruction, the system stores a character string 'withdraw operation path selected' during the applicable path operation. Therefore, it is possible to detect an inconsistency through a check of consistency between 'deposit operation' and 'withdraw operation path selected' carried out after the completion of the processing of the operation path, enabling actions, such as termination or repeating the operation from the beginning, to be taken. Although this embodiment stores character strings as information specific to each operation path, numbers may be used if they can identify the corresponding operation paths later.

Figure 9:
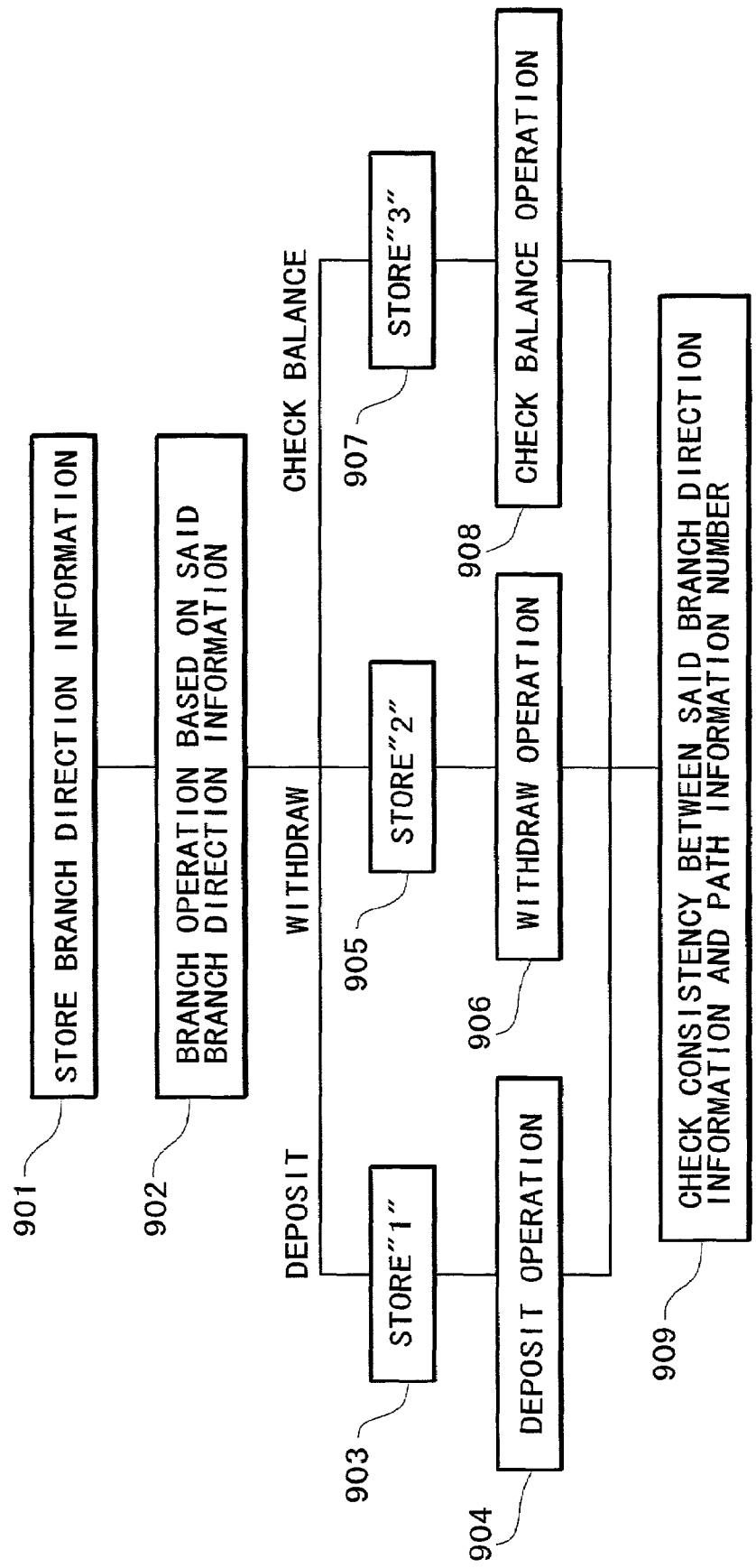
FIG. 9 is a flow diagram of processing that determines whether a branch instruction has been executed without fail based on information about an actually passed path.

FIG. 9 shows an exemplary means for detecting whether a conditional branch has been executed normally in a conditional branch operation. To execute a branch operation for determining a branch direction is stored in memory (901). The branch operation determines a branch path based on branch direction information (902). The deposit operation path (904) stores 1 as the path information (903). The withdraw operation path (906) stores 2 as the path information (905). The balance check operation (908) path stores 3 as the path information (907). Users of the system can know whether the intended operation path has been selected by checking which value of 1, 2, and 3 has been stored corresponding to the applicable operation path (909). As described above, it is also possible to retain the result of path selection by setting simple values. In addition, it is possible to provide a procedure for users of the system to use output results of a one-of-a-kind information processing unit by limiting path information to values specific to the system, thereby enabling improvement of the usability. Causing an examination operation to be used in common by making the procedure repeatable can save program memory; and, further, if the operation is made hardware operable as a common check operation, it is also possible to speed up the operation.

Figure 10:
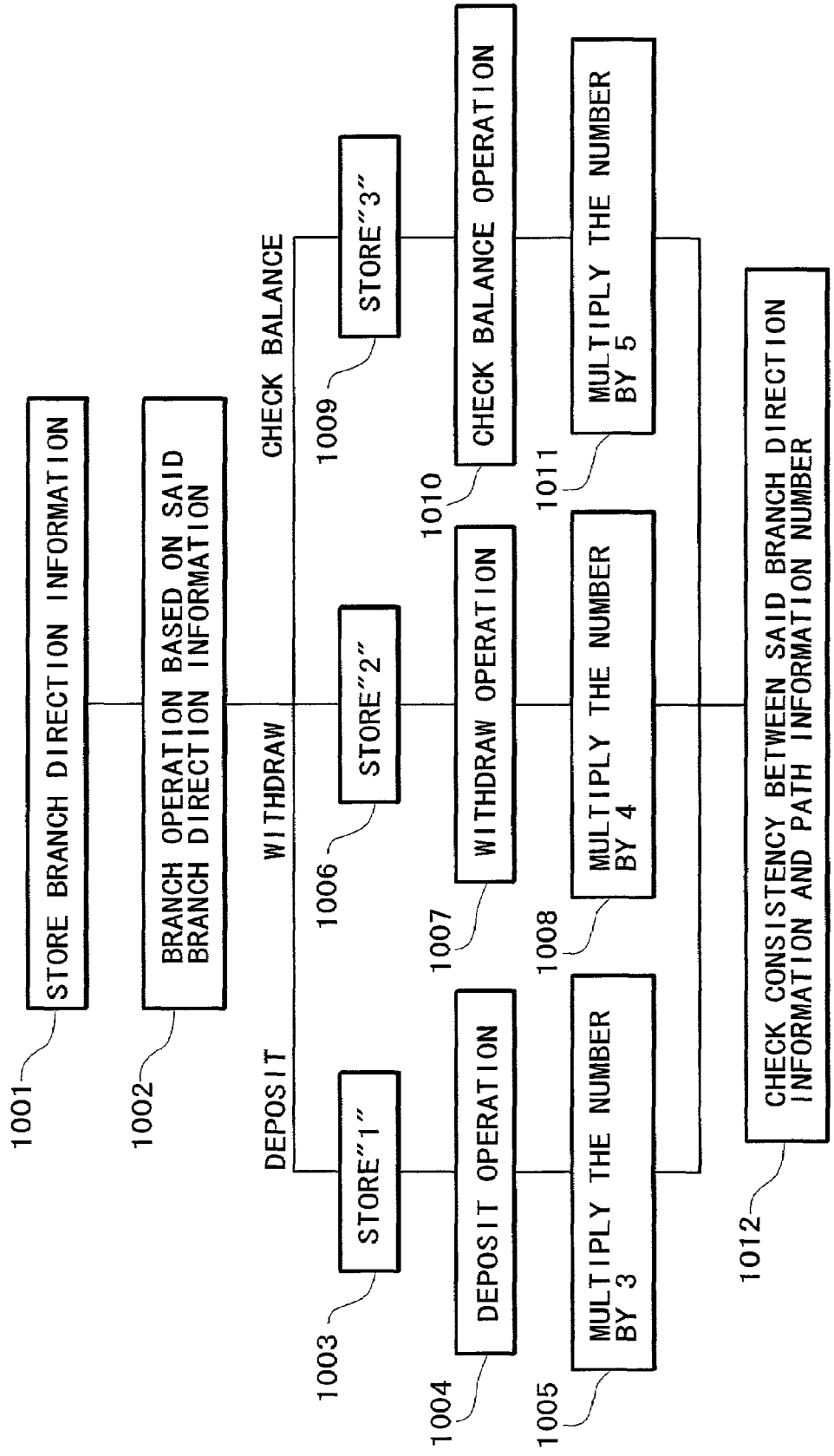
FIG. 10 is a flow diagram of processing that detects path transitions during path processing by providing examination processing at the start and end points of the path as branch direction information.

The operation for storing operation path-specific information may be executed with any timing and any number of times after a branch to the operation path. FIG. 10 shows an example in which mathematical operations are executed twice on the operation path.

This example assumes that at the start of a deposit operation (1004), a value '1' is set (1003); at the start of a withdraw operation (1007), a value. '2' is set (1006); and at the start of a balance check operation (1010), a value '3' is set (1009). It also assumes that at the end of the deposit operation, the value is multiplied by three (1005); at the end of the withdraw operation, the value is multiplied by four (1008); and at the end of the inquiry operation, the value is multiplied by five (1011).

At this time, the finally obtained number '3' indicates correct operation of the deposit operation path; the number '4' indicates that a malfunction, arising during the deposit operation path, caused a transition to the withdraw operation path; the number '5' indicates that a malfunction, arising during the deposit operation path, caused a transition to the balance check operation path; the number '6' indicates that a malfunction, arising during the withdraw operation, caused a transition to the deposit operation path; the number '8' indicates successful completion of the withdraw operation path; the number '10' indicates that a malfunction, arising during the withdraw operation path, caused a transition to the balance check operation path; the number '9' indicates that a malfunction, arising during the inquiry operation path, caused a transition to the deposit operation; the number '12' indicates that a malfunction, arising during the balance check operation path, caused a transition to the withdraw operation; and the number '15' indicates successful completion of the inquiry operation. There is no chance of obtaining numbers other than these. Numbers other than the above indicate malfunctions.

Now suppose a deposit operation is executed. The system stores the character string 'deposit operation', which is information for determining the branch direction (1001), then executes the branch operation (1002). System operation transits to the deposit operation path according to the branch instruction and stores the number '1' at the start of the deposit operation path (1003). The system terminates the deposit operation (1004), multiplies the stored number '1' by three at the end of the deposit operation path, and stores the result '3' (1005). After completion of the operation of the applicable operation path, the system knows that '3' is to be compared to the result, from the character string 'deposit operation' it stored before the branch operation. Successful completion of the deposit operation can be assured by checking that the number that has been set during operation of the operation path is '3' (1012).

Selecting operating methods so that all of the possible operation paths have different respective values, as described above, enables not only verification of an operation path that has been used-at the end of the operation path, but also detection of malfunctions during operations on the path. The more verification checks that are made during operations on each path, the more detailed the check on each operation path can be.

Figure 11:
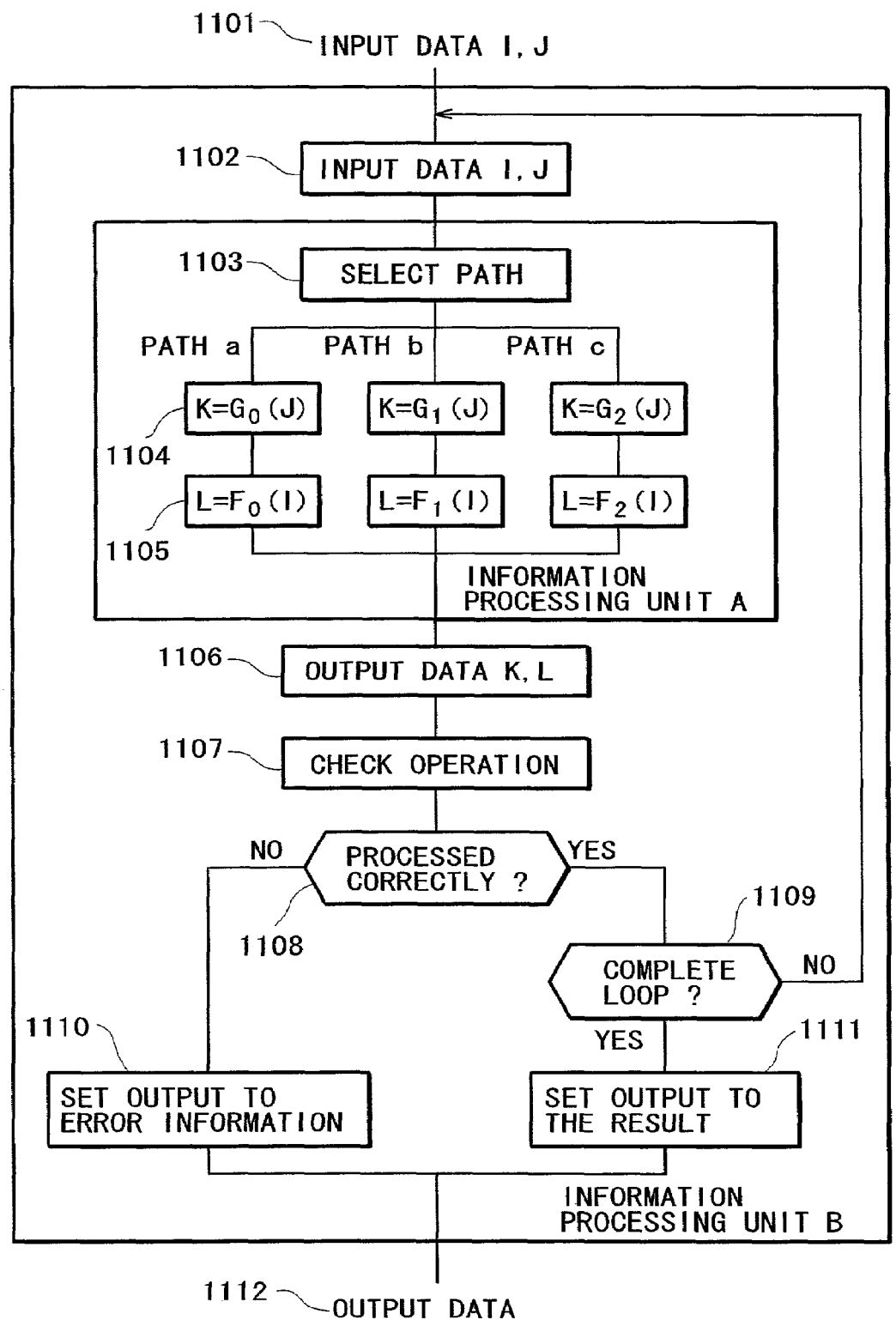
FIG. 11 is a flow diagram of processing that improves abnormality detection rates by verifying branch processing a plurality of times.

FIG. 11 is a flow diagram showing the operation of an information processing unit B having an internal information processing unit A of the type shown in FIG. 10, which verifies the output of the information processing unit A, outputs a correct computed result if the computation is valid, and outputs information indicating an error if the computation is invalid. The verification of branch operations uses an input value to information processing unit B (in this embodiment, the same value as input to information processing unit A) and output data K and L that are results of branch operations in information processing unit A. Implementing the check operations with, hardware enables reduction in the time required for verification even with complicated operations on data J.

In addition, when information processing unit B malfunctions, a user of the system can obtain an output result indicating that the malfunction has occurred and perform appropriate post-processing, such as retry processing, so that an information processing unit provided with a check operation for conditional branches has a large effect. Information processing unit B inputs the input data (1101) to the input of the information processing unit A as is (1102), and uses it with the output (1106) of the information processing unit A to perform a check operation.

As the operation result, the data output means sets the result data (1111), if it determines that the result of information processing unit A is valid, so as to output the result data (1111); whereas, if it determines that the result is invalid, it sets output data indicating an error (1110) and outputs the set data (1112). Suppose now that input data I and J are given. The information processing unit performs operations on I and J (1104 and 1105). Suppose that operation f (1105) indicates a computation for enciphering I by a method depending on the computation path, and operations $G_0$, $G_1$, and $G_2$ (1104) add 0, 1, and 2 to J, respectively. The information processing unit B determines whether the path has been selected correctly, depending on the input value of J, from the input and output values of information processing unit A. A check operation (1107) determines an assumed path by using an operation equivalent to the path selection operation (1103), and performs an applicable operation G on J (1104), a decision operation (1108) checks consistency between the result and the output value K of information processing unit A, determining that the path has been selected correctly if the result matches K, and sets the output data to the result (1111). If the result does not match K, the operation is determined not to have been performed correctly, and the output data is set to error information. Information processing unit B thus performs extra operations for detecting the presence or absence of a malfunction from the result output from information processing unit A, which eliminates the need for the user to detect the presence or absence of a malfunction in his own way. The information processing unit shown in FIG. 11, further, performs the check operation a plurality of times, and if all checks are passed (1109), it outputs a correct operation result; whereas, if the operation fails, it outputs error information. Since the probability of occurrence of malfunctions and the timing of their occurrence vary with the environments in which the information processing unit is placed and the types of attacks made on it by malicious persons, it is not certain that one check operation will be performed correctly. Therefore, it is possible to reduce the probability of occurrence of malfunctions in the check operation itself by doing the check operation a plurality of times. If a first check operation has a 50% chance of erroneously determining that the operation has been done correctly, the probability that a second check operation outputs an erroneous result is 25%, with a third check operation the probability is 12.5%, and the probability of an error in the seventh check operation becomes less than 1%. In addition, it is possible to terminate all operations in the system instead of outputting information indicating that there is an error in the operation when the information processing unit detects a malfunction. There is a possibility that, when numerous malfunctions are caused unintentionally by an environmental change or intentionally by a malicious person, the system may become unable to transmit output data indicating occurrence of the malfunctions to the outside normally. In such a case, issuing a stop command to the entire unit from the information processing unit provides the best way of minimizing the malfunctions therein. The unit may be stopped either temporarily or permanently.

(4) Counter Operation

Counters are important for defining numeral limits, such as the number of times a service is provided, which is essential to a service operation system that provides access to processors. Reliable counting operations are required because, if a counter fails to decrement, the user can continue taking advantage of the processor in excess of the defined number of times. Alternatively, a decrementing malfunction may make it impossible for the user to use the processor a number of times less than the defined number, thereby disabling the service. In addition, the waiting time for the completion of external operations is generally set by a process that makes a fixed number of loops, so a change in the loop count due to a malfunction presents a fatal problem for consistent data exchange. Another known problem is that a failure of synchronization when a stream cipher is used may allow the entire subsequent ciphered string to be deciphered.

Figure 12:
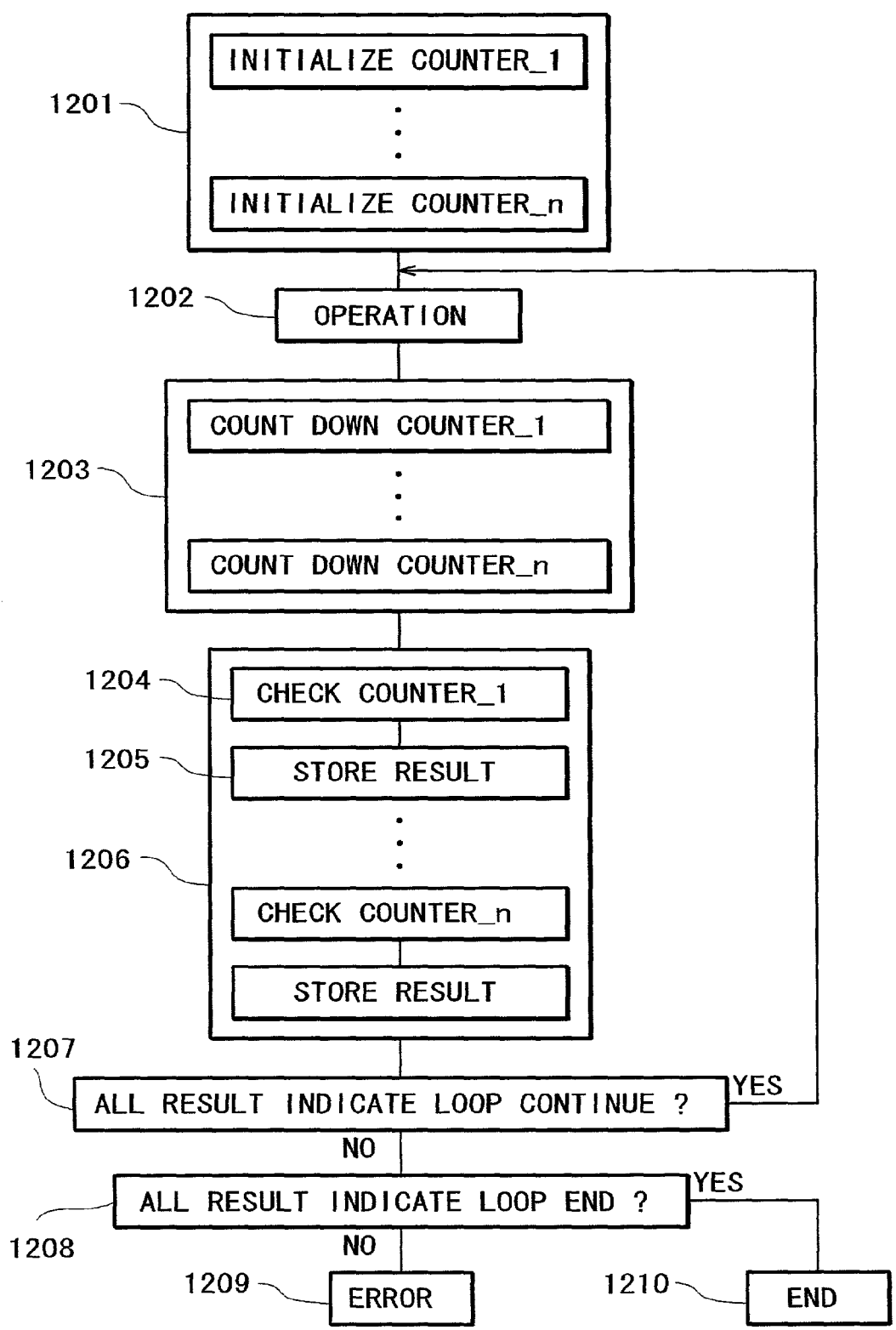
FIG. 12 is a flow diagram of processing that uses a plurality of counters to prevent errors from being generated due to erroneous counter values.

Therefore, this countermeasure provides two or more counters, performs count processing for each of the counters, and completes an operation only when all of the counters reach the completion condition. If only some of these counters reach the completion condition during the operation, that indicates the occurrence of a malfunction, so action is taken, such as issuing an error message or terminating the operation. The procedure is shown in FIG. 12 and will be described below.

1. Initialize the counters (1201).

2. Perform processing within a loop (1202).

3. Decrement the counters (1203).

4. Determine completion of each counter (1204).

5. Store the result of the completion determination of each counter (1205).

6. Return to 2 if the all result indicate loop continue (1207).

7. Complete the operation (1210) if the all result indicate loop end (1208).

8. Otherwise, perform error processing (1209).

This countermeasure provides two or more counters, and begins by initializing them (1201); next, it enters a loop and performs processes within the loop (1202); then, it decrements each of the counters (1203); next, a checking and storing procedure is performed (1206), which determines completion of each of the counters (1204) and then stores the result of the completion determination of each of the counters (1205). Then, it reads the results of the completion determination of all of the counters (1207); and, if the results are all indicate loop continue (1207), it continues the loop processing (1202); while, if the results are all indicate loop end (1208), it completes the loop processing (1210). Cases other than these indicate that only some counters have reached the completion status, so the countermeasure process determines that a malfunction has occurred and performs error processing (1209).

Figure 13:
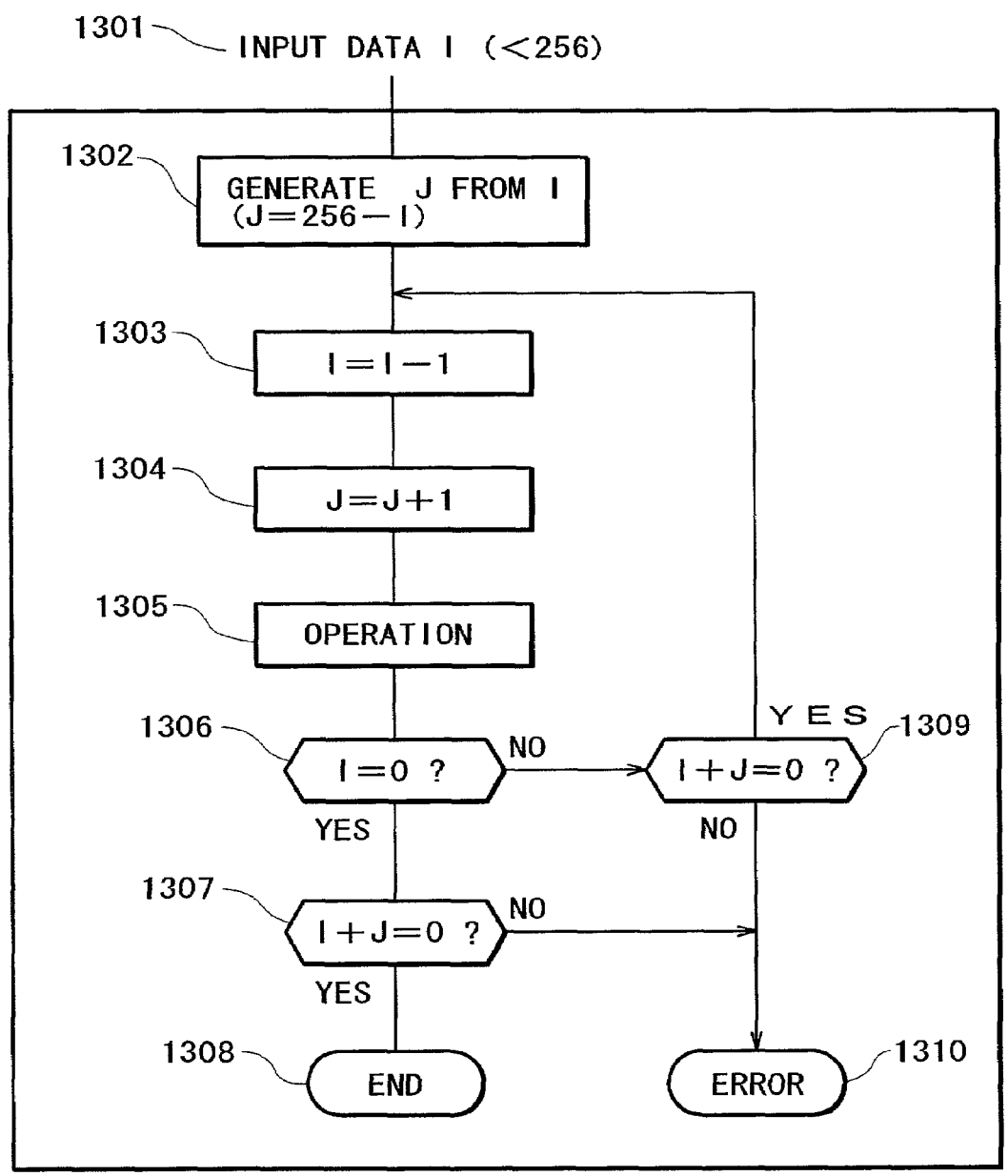
FIG. 13 is a flow diagram of loop processing that detects malfunctions of a counter by using the sum of the values of two counters.

A conventional iterative operating system iterates an operation until the result of decrementing an input counter value becomes zero. An embodiment that prevents an iterative operation from being terminated before the counter value reaches a defined value due to a malfunction during the iteration will be described with reference to FIG. 13. Suppose input data I is a number less than 256 (1301), and J is generated as J=256−I (1302), the count-down processing employing the decrement and increment processing generally used by a computer. Then, I=I−1 (1303) and J=J+1 (1304); an operation (1305) is performed, and a check on whether counter I is 0 or not is performed in the same way as in ordinary loop processing (1306).

If I is not 0, the system performs operation I+J (1309); whereas, if I is 0, it is determined that an error has not occurred and the operation proceeds to the next loop iteration (1307). If it is determined that an error has occurred (I+J≠0) at this time, the system outputs data indicating the error and performs a reset and other processing as necessary without delay (1310). If it is determined that I=0 (1306), the system also verifies whether I+J equals 0 (1307). If the result is 0, the system proceeds to the completion operation (1308); whereas, if the result is not 0, the system proceeds to error processing (1310). The counter is set to 256 or less here because 8-bit numbers are easy for an actual CPU to handle, but this limitation is not essential.

Although this embodiment uses two counters, similar processing can be applied to cases using three or more counters. Although the counting operation is performed by decrementing or incrementing, other types of operations may be used.

Figure 14:
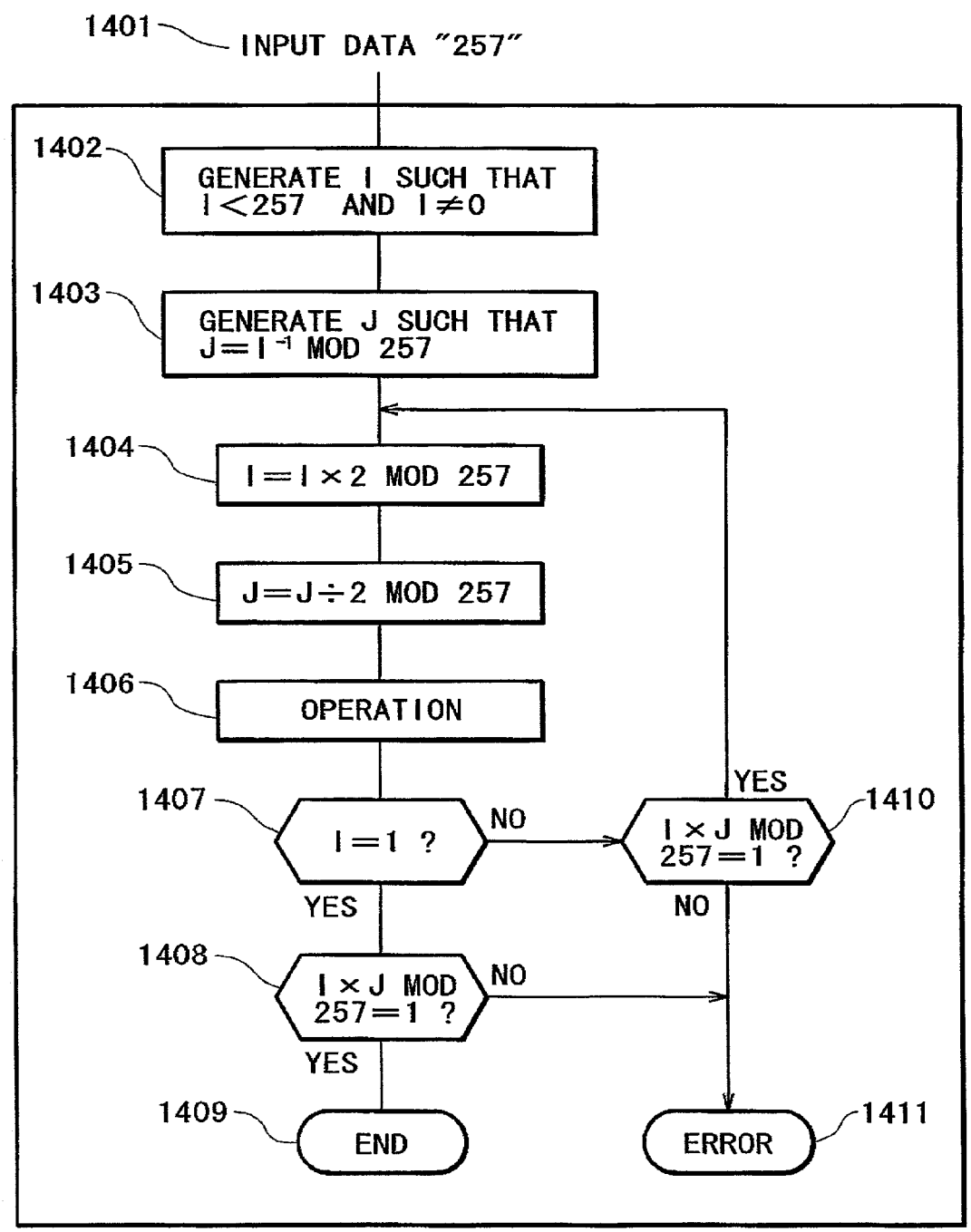
FIG. 14 is a flow diagram of loop processing that detects malfunctions of the product of the values of two counters.

FIG. 14 shows a case using multiplication and division as an example. This example executes the loop 256 times. The input data is 257 (1401). First the system generates a number I that is not 0 (1402). Next, J is set to the reciprocal of I modulo 257 (1403). Then, I counting is performed by multiplication by 2 modulo 257 (1404), and J counting is performed by division by 2 modulo 257 (1404 and 1405). An operation 1404 is performed. The counter completion condition is I=1 (1407). After checking that the I counter satisfies the completion condition, the system verifies I×J mod 257 equals 1 to check consistency with the other counter J (1408 and 1410); and, a value other than 1 indicates a malfunction, so that the system performs error processing (1411). If counting is completed and the counters I and J are consistent, the system terminates the loop (1409). This embodiment uses Euler's theorem. According to this theorem, suppose p is a prime number and $1 \leq y \leq p$; then $y^{\phi(p)} \bmod p = 1$, where $\phi(x)$ represents Euler's function. That is, raising a number I relatively prime to 257 (since 257 is a prime number, any non-zero number equal to or less than 256 is relatively prime to 257) to the $\phi(257)=256$th power produces 1.

(5) Counter Specific to the Unit

An information processing unit, in which the number of times a process is called can be limited by the user, will now be described. The information processing unit has a specific counter which decrements on every call; and, if the number of calls exceeds a given number, execution of the processing is rejected for subsequent calls, This can prevent processing from being executed a number of times, exceeding an anticipated number due to malfunctions that have not been anticipated by the designer. For example, if a malfunction occurs when a processor for outputting data is called, the processor may output more data than required. This may lead to leakage of important information from systems retaining important information from a security viewpoint (such—as IC cards and financial terminal equipment) and can raise fatal problems, so protection by the present invention will be necessary. In addition, limiting the number of times a processing can be executed can inhibit unauthorized use of a processor section of the information processing unit by taking it out alone and building it into another unit. For this purpose, the following procedure is used.

1. A counter in the unit is initialized to a given value based on initialization data.

2. The processor decrements the counter every time it is called and checks if the counter has reached the completion condition or not.

3. If the counter is not in the completion state, the processor executes the processing.

4. If the counter is in the completion state, the processor rejects and terminates the processing.

5. The controller sends the initialization data to the unit in response to a request from the outside.

Figure 15:
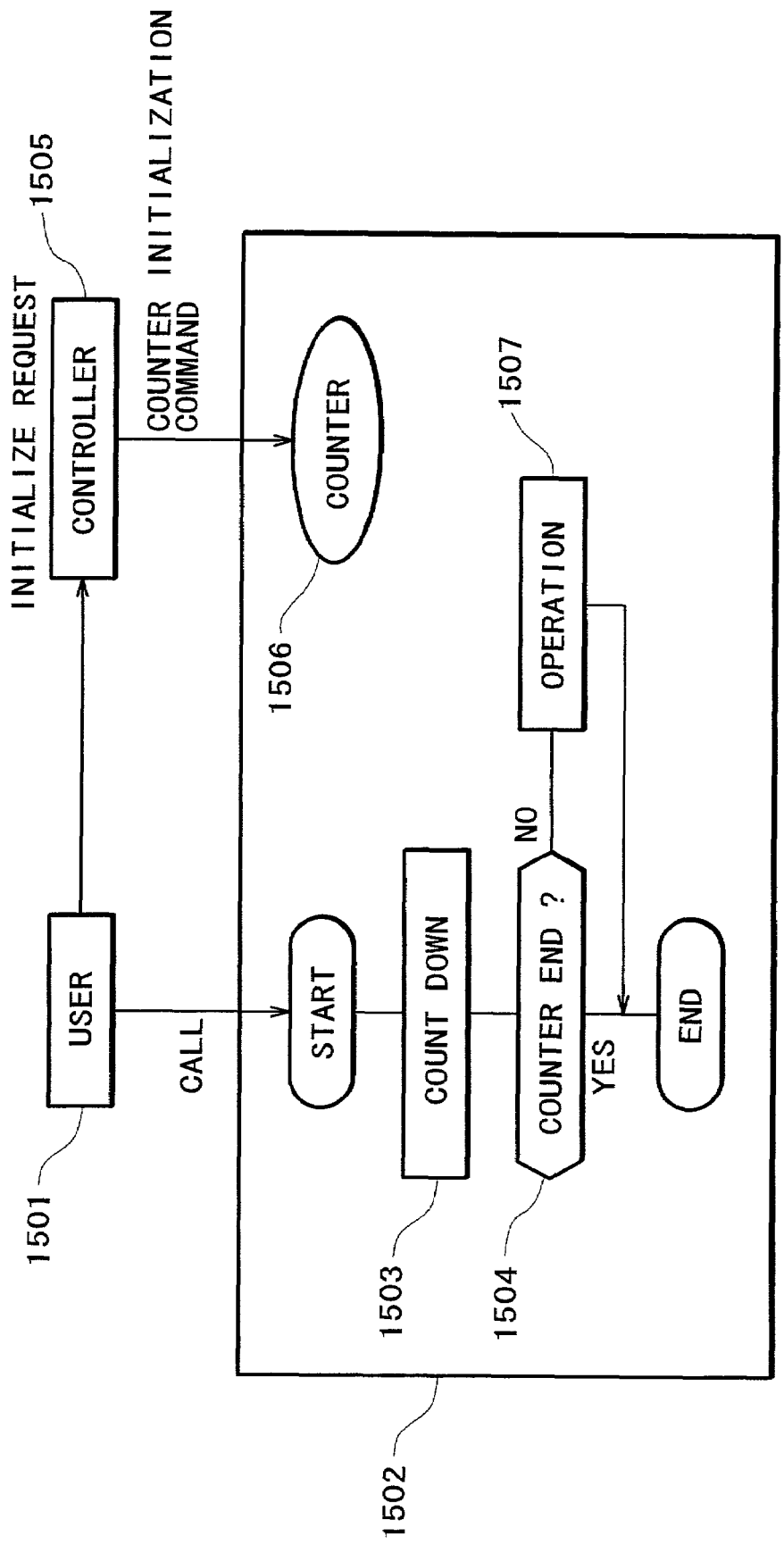
FIG. 15 is a flow diagram showing a method of operating an information processing unit having equipment to restrict the number of activations using its own counter.

As shown in FIG. 15, a user (1501) requests a controller (1505) to initialize the counter. In response to the request, the controller sends an initialization code for initializing an internal counter (1506) to the processor. The processor initializes the internal counter according to the initialization code. When the user calls the processor (1502), the processor decrements the counter (1503), and checks to see if the counter has reached the completion condition (1504). If the counter has not reached the completion condition, the processor executes an operation (1507); whereas, if the counter has reached the completion condition, the processor terminates the operation. If security is a concern, initialization of the counter of the processor can make use of verification by encrypted passwords and other applicable methods.

As shown in FIG. 15, the controller (1505) receives the initialization request from the user (1501). The controller validates the user request, and then sends the processor (1502) a counter (1506) initialization command. The processor validates the counter initialization command, and then sets the counter to the requested value. Next, the user calls for program execution by the processor. In response to the call, the processor decrements the internal counter (1503). At this time, if the internal counter has not reached the completion condition (1504), it executes an operation (1507); whereas, if the internal counter has reached the completion condition, it terminates the operation without doing anything. If the processor does no processing in response to a call, the user executes another initialize request to the controller. Similar operations are performed subsequently.

Figure 16:
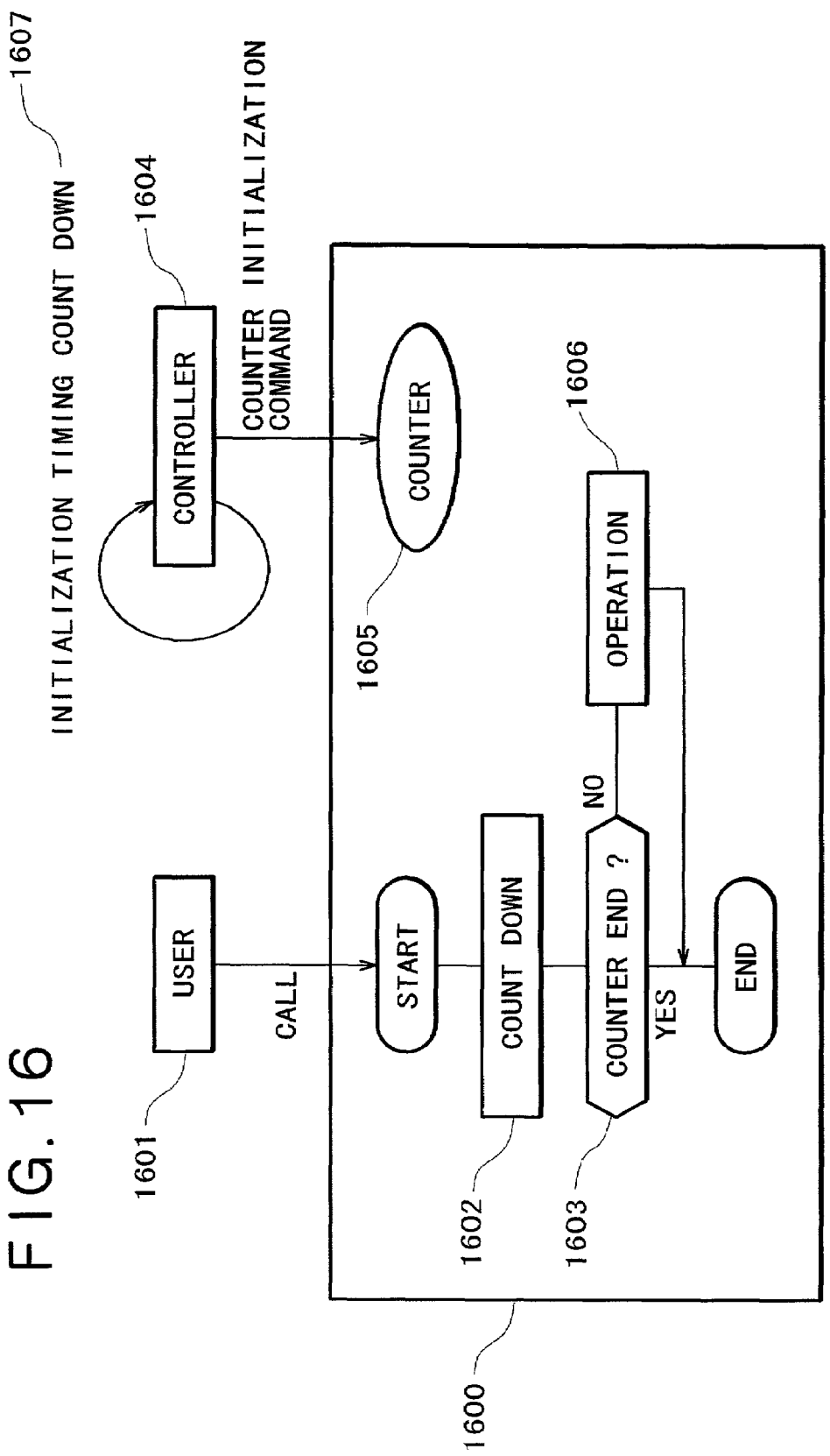
FIG. 16 is a flow diagram showing a method of operating an information processing unit having a controller that initializes counters automatically and equipment to restrict the number of executions by counters.

As shown in FIG. 16, the user (1601) calls the processor (1600), and the processor decrements the counter (1602), and checks if the counter has reached the completion condition (1603). If the counter has not reached completion condition, the processor executes an operation (1606). If the counter has reached the completion condition, the processor terminates the operation.

The controller may initialize the internal counter (1605) of the processor at fixed intervals without a request from the user. In this case, as shown in FIG. 16, a controller (1604) decrements the counter on its own (in synchronization with a clock, for example) (1607), thereby determining the initialization timing, and sends a counter initialization command at fixed intervals.

If an encrypted password-protected method is used for the counter initialization command of the processor, it is possible to enforce security against unauthorized use of the processor. This enables the system provider to impose restrictions on the use of resources by system users. The system provider can adjust the values of the counter initialization data and perform repetitive initialization with appropriate timing for users who have obtained appropriate qualifications.

In the foregoing description, tamper-evident features provided by alarms and control suspension have been emphasized, but instead, the system can continue operation by passing control to a re-computation process or by another applicable method. A persistent abnormal condition may cause an infinite loop, but if the condition keeps varying, it can be expected that the processing will ultimately continue and be performed successfully. The choice between stopping and continuing operations under abnormal conditions in this embodiment of the present invention can be left to the system designer. A high-security system may stop operation and issue an alarm; while, an advanced unattended system can be set to perform the highest possible degree of recovery and resume processing. These methods can be used in combination as required to provide an increased possibility of malfunction detection.

The embodiments of the present invention enable detection of malfunctions of an information processing unit.

What is claimed is:

1. An information processing unit, comprising:
a memory storing a program; and
a program counter,
wherein the information processing unit operates based on the program counter and executes instructions sequentially placed at addresses pointed to by the program counter,
wherein a second conditional branch instruction is written at a second address subsequent to a first address where a first conditional branch instruction is written in the program,
wherein the information processing unit branches into an operation B if a condition flag is a predetermined value in execution of the first conditional branch instruction,
wherein the information processing unit proceeds to the second conditional branch instruction if the condition flag is not the predetermined value in execution of the first conditional branch instruction,
wherein the information processing unit branches into an error processing if the condition flag is the predetermined value in execution of the second conditional branch instruction, and
wherein the information processing unit proceeds to an operation A if the condition flag is not the predetermined value in execution of the second conditional branch instruction.

2. The information processing unit according to claim 1, wherein the error processing is bringing the information processing unit to a halt.

3. The information processing unit according to claim 1, further comprising:
a general arithmetic and logic unit,
wherein the conditional flag is either one of a half-carry flag, a negative flag, a zero flag, an overflow flag, and a carry flag,
wherein the half-carry bit is set to 1 when a carry or borrow appears in the central bit in an arithmetic operation of the arithmetic and logic circuit,
wherein the negative flag is set to 1 when a computed result of the arithmetic and logic unit is a negative value,
wherein the zero flag is set to 1 when the computed result of the arithmetic and logic circuit is zero,
wherein the over-flow flag is set to 1 when the computed result of the arithmetic and logic unit causes an overflow, and
wherein the carry flag is set to 1 when a carry has occurred in the computation of the arithmetic and logic unit.

4. An information processing unit comprising:
a memory storing a program; and
a program counter,
wherein the information processing unit operates based on the program counter and executes instructions sequentially placed at addresses pointed to by the program counter,
wherein one or more second conditional branches are written successively at addresses subsequent to a first address where a first conditional branch is written in the program,
wherein the information processing unit branches into an operation B if a condition flag is a predetermined value in execution of the first conditional branch instruction,
wherein the information processing unit proceeds to the instruction written at the subsequent address of the program counter if the condition flag is not the predetermined value in execution of the first conditional branch instruction,
wherein the information processing unit branches into an error processing if a condition flag is the predetermined value in execution of the second conditional branch instruction, and
wherein the information processing unit proceeds to the instruction written at the subsequent address of the program counter if the condition flag is not the predetermined value in execution of the second conditional branch instruction.

5. The information processing unit according to claim 4, wherein the error processing is bringing the information processing unit to a halt.

6. The information processing unit according to claim 4, further comprising:
a general arithmetic and logic unit,
wherein the conditional flag is either one of a half-carry flag, a negative flag, a zero flag, an overflow flag, and a carry flag,
wherein the half-carry bit is set to 1 when a carry or borrow appears in the central bit in an arithmetic operation of the arithmetic and logic circuit,
wherein the negative flag is set to 1 when a computed result of the arithmetic and logic unit is a negative value,
wherein the zero flag is set to 1 when the computed result of the arithmetic and logic circuit is zero,
wherein the over-flow flag is set to 1 when the computed result of the arithmetic and logic unit causes an overflow, and
wherein the carry flag is set to 1 when a carry has occurred in the computation of the arithmetic and logic unit.

* * * * *